United States Patent
Cremia

(12) United States Patent (10) Patent No.: US 6,477,704 B1
Cremia (45) Date of Patent: Nov. 5, 2002

(54) METHOD OF GATHERING AND UTILIZING DEMOGRAPHIC INFORMATION FROM REQUEST-BASED MEDIA DELIVERY SYSTEM

(76) Inventor: Lawrence Cremia, 1469 Colonial Blvd. Ste. 22, Fort Myers, FL (US) 33907

( * ) Notice: Subject to any disclaimer, the term of this patent is extended or adjusted under 35 U.S.C. 154(b) by 0 days.

(21) Appl. No.: 09/337,808

(22) Filed: Jun. 21, 1999

(51) Int. Cl.[7] .......................... H04N 7/10; H04N 7/025; H04N 5/445; G06F 3/00; G06F 13/00
(52) U.S. Cl. ........................ 725/35; 725/36; 725/46; 725/61; 725/32
(58) Field of Search ........................ 725/13, 32–33, 725/35–36, 46, 42, 61; 709/217–220; 705/10–14; 345/721

(56) References Cited

U.S. PATENT DOCUMENTS

| | | |
|---|---|---|
| 5,155,591 A | 10/1992 | Wachob |
| 5,512,934 A | 4/1996 | Kochanski |
| 5,703,795 A | 12/1997 | Mankowitz |
| 5,708,478 A | 1/1998 | Tognazzini |
| 5,749,043 A * | 5/1998 | Worthy ....................... 455/2.01 |
| 5,751,968 A | 5/1998 | Cohen |
| 5,758,257 A | 5/1998 | Herz et al. |
| 5,790,423 A | 8/1998 | Lau et al. |
| 5,819,160 A | 10/1998 | Foladare et al. |
| 5,835,843 A | 11/1998 | Haddad |
| 5,848,397 A * | 12/1998 | Marsh et al. .................. 705/14 |
| 5,864,753 A | 1/1999 | Morita et al. |
| 5,874,986 A | 2/1999 | Gibbon et al. |
| 5,991,735 A * | 11/1999 | Gerace ......................... 705/10 |
| 6,064,376 A * | 5/2000 | Berezowski et al. ........... 725/42 |
| 6,160,546 A * | 12/2000 | Thompson et al. ......... 345/721 |

\* cited by examiner

*Primary Examiner*—Andrew Faile
*Assistant Examiner*—Hai V. Tran
(74) *Attorney, Agent, or Firm*—Anton J. Hopen; Smith & Hopen, PA

(57) ABSTRACT

A method of automatically delivering media based on audience requests. The method statistically identifies the most requested media content and assembles a play list from individual media segments in a catalog database. Demographic information gathered from the audience requests is used to dynamically insert commercial media segments into the play list. Demographically linked news and weather updates may also digitally recorded and interspersed between requested media segments.

18 Claims, 5 Drawing Sheets

*Fig.* 2

METHOD OF GATHERING AND UTILIZING DEMOGRAPHIC INFORMATION FROM REQUEST-BASED MEDIA DELIVERY SYSTEM

FIELD OF INVENTION

The present invention relates generally to media delivery methods, and more particularly to a method of gathering and utilizing demographic information from a request-based media delivery method.

BACKGROUND OF THE INVENTION

An ongoing difficulty in delivering media content is matching the interests and preferences of the audience with the needs and objectives of the sponsors. Audience members often view the sponsors' commercials as wasted time between music, sports, news or commentary. Conversely, sponsors' view the music, sports, news or commentary as wasted time between the broadcast of their commercials. Audience members want to see and hear content that matches their tastes and sponsors want to reach audience members that are most apt to purchase their products and services. However, determining the demographics of audience members has been traditionally difficult to achieve with acceptable precision and accuracy.

Another problem with calculating demographics is the dynamic nature of audience groups. For example, the demographics for a particular radio station may change depending on the hour of the day or the day of the week. Students in school may not be permitted to listen to the radio during classroom instruction. Therefore, during school hours, the number of younger listeners may drop while the number of older listeners who tune in during work may rise. Likewise, during the weekend when students are not in school, the number of younger listeners may be much higher than at the same time of day on a school day. This shift in demographics is important to sponsors so they may reach their intended audience while that audience is tuned in.

Another problem with delivering media content is the significant overhead required to operate the enterprise. A great deal of the operations are repetitious in nature, yet most broadcast entities must pay disc jockeys, support personnel, news anchors and the like significant salaries to provide such services.

Another problem with media delivery operations is that content providers, such as music companies, often have difficulty in determining their demographics from the limited information provided by current operations. For example, radio stations may provide the content providers with the number of requests they receive for a particular song. However, the radio stations typically take the request telephonically without inquiring as to the demographic information of the requestor such as age, gender, residential location, and the like. Therefore, content providers do not possess this demographic information which may be used to further their marketing efforts in other settings such as retail or online sales.

Consequently, there is a need in the art to provide audience members with a meaningful opportunity to select the media content they wish to see and hear.

There is a further need in the art to provide broadcast entities with a efficient and reliable broadcast method with greatly reduced operating costs.

There is a further need in the art to provide sponsors with demographic information on the audience of the broadcast entities in order to target the appropriate product or service to those audience members.

There is a further need in the art to provide content providers with demographic information on the relative popularity of their content.

However, in view of the prior art in at the time the present invention was made, it was not obvious to those of ordinary skill in the pertinent art how the identified needs could be fulfilled.

SUMMARY OF THE INVENTION

The above and other objects of the invention are achieved in the embodiments described herein by a method of delivering media content comprising the steps of creating a membership database, obtaining requests for content from individuals registered in the database, broadcasting the most requested content and analyzing the demographic information of the individuals to associate and target advertising and information dissemination.

Creating the membership database comprises the steps of obtaining an array of demographic information from an individual. This array may include such variables as age, sex, residential location by zip code, and income level. It is preferable that this information be kept confidential and that the individual entering the information understand the confidentiality measures to insure an open and truthful disclosure of such demographic information. Once the array of demographic information is assembled for the individual, a unique membership ID is assigned to that individual. The unique membership ID may include a password to insure the validity of its use. The unique membership ID is associated with the array of demographic information for that user and stored in a membership database.

The demographic information may be gathered by a number of mediums. In one embodiment of the invention, the demographic information is obtained by telephonic means comprising the steps of accepting an incoming telephone call from a telephone caller and prompting the caller to relay an array of demographic information. For example, a telephone control system prompts the user for their age. The caller then enters in their age by depressing the corresponding numerals on a touch-tone telephone. The telephone produces dual-tone multi-frequency signals ("DTMF") which are interpreted by the telephone control system and stored in the membership database. A unique membership ID may then be read back to the caller by voice synthesis.

An alternative method of gathering the demographic information utilizes a data network connection such as the Internet. One or more form-based interfaces are enabled on a data network. The interface may be a propriety client-server model or a standardized interface such as HTML used on the World Wide Web. A network user accesses the interface is prompted for an array of demographic information. Once the network user posts his or her entries, a membership ID is transmitted to the network user by electronic mail.

Once an individual's demographic information is obtained and a method of identifying the individual is established from the unique membership ID, the next step is to permit the individual to select the media content they wish to see or hear. The media content may include audio broadcasts of music, weather, news, or sports. It may also include delivering video segments such as movies, music videos, weather broadcasts or educational videos. The delivery may be from a traditional radio frequency transmission such as radio, or may include alternative mediums such as satellite, cellular, or data communication pathways. The delivery may take place on a closed, private network or via an open network such as the Internet.

Obtaining a request for media content comprises the steps of identifying the individual from the unique membership ID and prompting the individual for the selection of a media segment from a catalog database. The catalog database is a collection of available media content in digital form. For example, audio content may be stored in MP3, WAV, or other digital audio formats. Video segments may be stored as AVI, MPEG or the like. By storing the media content in digital format, a plurality of individual media segments may be later assembled into a seamless broadcast.

Once the individual has selected a media segment from a catalog database, the next step is associating the media segment and the individual's array of demographic information in a request database. This association will be analyzed to determine a correlation between the individual's array of demographic information and the type of media content that individual prefers.

Broadcasting the media content comprising the first step of first accessing the request database. It is anticipated that a plurality of requests will exist for the same media segment. A predetermined formula is applied to the information in the request database to determine which of the most requested media segments are assembled into a play list. The predetermined formula may restrict the number of times a popular media segment may be replaying during a set period of time. The play list is then assembled from the catalog database based on the predetermined formula. The play list is then broadcast through the appropriate medium.

Because the demographic information of the audience is monitored dynamically, a unique opportunity exists for sponsors to optimally target their products and services. Based on known demographic patterns, individual commercial segments are interspersed at predetermined intervals within the play list. A preferred embodiment of broadcasting the individual commercial segments comprises the steps of associating a demographic value with an individual commercial segment, analyzing the play list for one or more common demographic values of the individuals who requested the media segments in the play list and broadcasting the individual commercial segments whose demographic values most closely match the common demographic values of the individuals who requested the media segments in the play list. In a preferred embodiment, the number of instances the individual commercial segment is played is recorded. The opportunity for an individual commercial segment to be inserted into the play list may be restricted by a predetermined formula.

In many circumstances, it will be preferable or even required to intersperse a system identifier at predetermined intervals within the play list. For example, government regulations may require the broadcast entity to periodically identify itself to its audience members. A variable may be associated with the system identifier that tracks the time and frequency that the system identifier is broadcast. The variable is monitored to ensure that the system identifier is inserted into the play list with the desired frequency.

Similar to the insertion of the system identifier, public service announcements may be inserted at predetermined intervals within the play list. A plurality of preset public service announcements may be stored in the catalog database for intelligent insertion into the play list according to the demographics of the current audience members. For example, a public service announcement relating to attending school on a regular basis may be inserted into the play list should a demographics analysis of the request database indicate that the audience members are of a group that should be attending school. A variable may also be assigned to the public service announcements to insure that are played with a predetermined frequency.

Prerecorded news updates may be interspersed at predetermined intervals within the play list. The news updates may also be associated with a particular demographic target. Thus, the demographics of the current audience may be determined dynamically and news updates appropriate to that demographic are inserted into the play list. For example, should the demographics indicate a high number of audience members within a particular zip code, a news update may be provided that provides information relevant to that locality.

Prerecorded news updates may be obtained from a number of sources. In one embodiment of the invention, a media upload from an authorized user is inserted into the play list. The media upload may be sent through a digital connection for direct insertion. However, should the media upload be in an analog format, the analog media segment is converted to a digital media segment and inserted into the play list. In one embodiment, the media upload may be delivered electronically through a network interface from a verified source across a data connection using standard protocols such as IPX or TCP. Once received, the media segment is inserted into the play list. Alternatively, the media upload may be delivered telephonically wherein an authorized user depresses buttons on a touch tone telephone thereby creating DTMF signals. The DTMF signals validate the authorized user's identity. The authorized user then audibly records a media segment over the telephone line. Once completed, the authorized user may depress a button to store, delete, or replay the media segment. The authorized user may also depress touch tone buttons to select additional options such as scheduling the time of insertion of the media segment into the play list, scheduling the frequency in which the media segment is played, and scheduling the date or time in which the media segment expires. In a preferred embodiment, the media segments are time-stamped wherein out-of-date media segments are not inserted into the play list.

In a preferred embodiment, the demographic information associated with the play list is recorded into a history file. The history file may be analyzed by the broadcasting entity, the sponsors and the content providers to more efficiently provide goods and services to the audience members. Remote supervision and control of the delivery of media content may be maintained via a network connection to a remotely located network operations center. Monitoring the operations of the broadcast entity permits multiple broadcast entities to efficiently and reliable function automatically thereby greatly reducing the operating expense. More particularly, offloading the membership-associated functions to the remotely located network operations center has the benefit of creating a larger demographic analysis from a plurality of broadcast entities.

An object of this invention is to provide audience members with a meaningful opportunity to select the content they wish to see and hear.

Another object of this invention is to provide broadcast entities with an efficient and reliable broadcast system with greatly reduced operating costs.

Another object of this invention is to provide sponsors with demographic information on the audience of the broadcast entities in order to target the appropriate product or service to those audience members.

Another object of this invention is to provide content providers with demographic information on the relative popularity of their content.

An advantage of the invention is that audience members are able to choose the media content they wish to see and hear.

Another advantage of the invention is that broadcast entities may function efficiently and reliably with greatly reduced operating costs.

Another advantage of the invention is that sponsors may obtain valuable demographic information on audience members in order to properly target their products and services to those listeners most apt to become customers.

Another advantage of the invention is that content providers may retrieve demographic information on the relative popularity of their materials.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
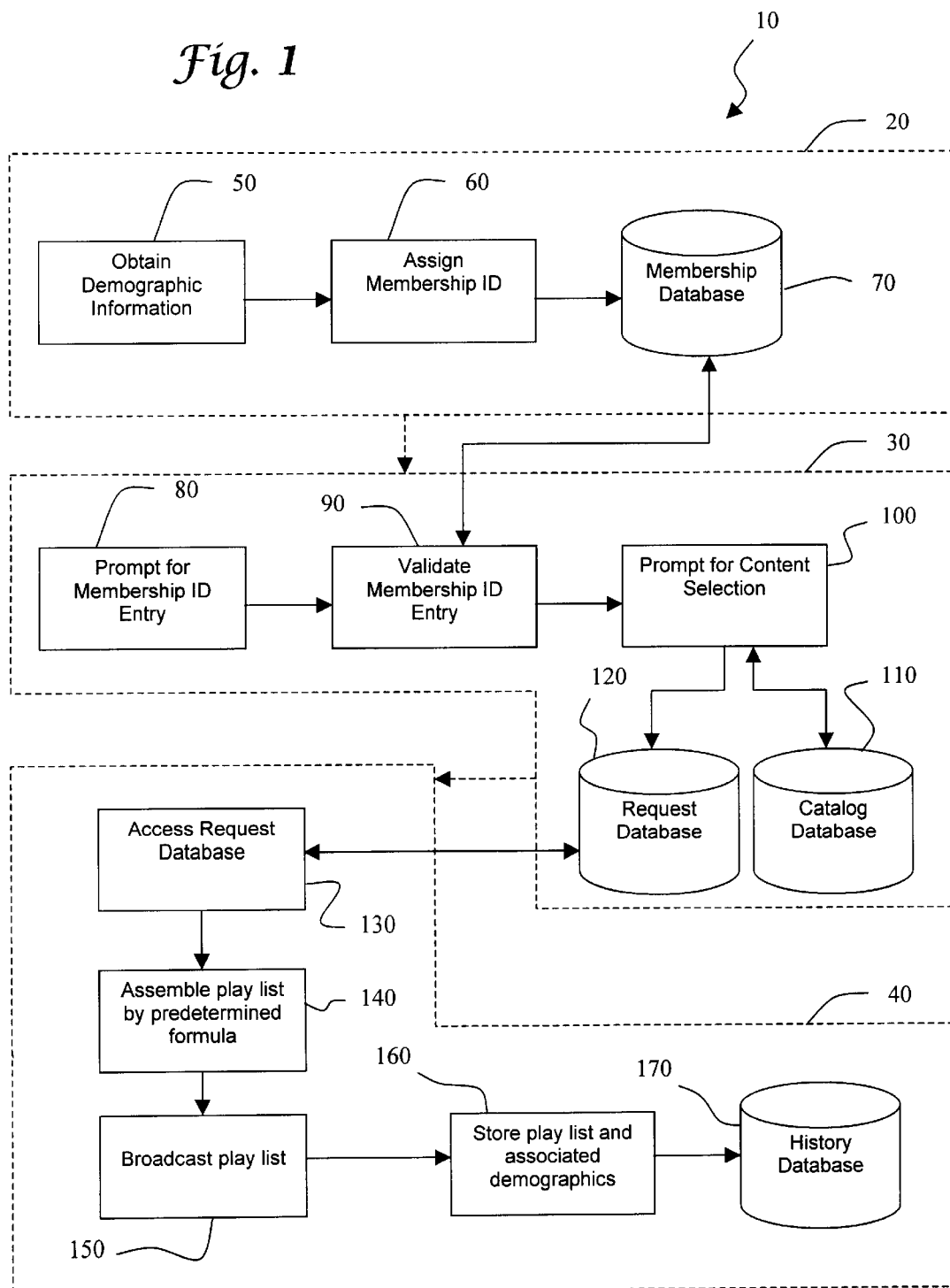
FIG. 1 is a flow chart describing the general operation of the invention.

Referring initially to FIG. 1, it will there be seen that an illustrative embodiment of the present invention is denoted by the reference number 10 as a whole. In general, the present invention may be presented in three stages: creating a membership database 20, obtaining requests for content 30 and broadcasting the content 40. The process of creating the membership database 20 further comprises the steps of obtaining demographic information 50 from an individual. Such demographic information may include the individual's gender, address, age, income and other factors that may be deemed relevant. Once the demographic information is obtained, the individual is assigned a membership ID 60 which is associated with the individual's demographic information in a membership database 70.

Once the individual has a valid membership ID, he or she may then access the system to request content they want delivered. The individual is prompted for his or her membership ID 80. The membership ID that is entered is validated 90 against the membership database 70. Upon successful validation, the individual is prompted for content selection 100. Such content selection may include music, comedy segments, educational segments or the like. The selection is validated against a catalog database 110 containing an index of all available content for broadcast. Should the catalog database 110 have the desired content selected by the individual, the selection is stored in a request database 120.

It is anticipated that a plurality of individuals will submit requests for content. Therefore, before any content is broadcast, the request database is accessed 130 for the most popular requests. A play list is assembled 140 using a predetermined formula based on the relative number of requests for each available content segment by individuals. Such formula is preferably based on a bell-curve. The most popular content is then broadcast 150 to the individuals. Once a segment is broadcast, the play list and associated demographics of the individuals that requested the same are stored 160 in a history database 170. The history database 170 may be accessed at any time to determine a demographic pattern of the individuals listening to the broadcast.

Figure 2:
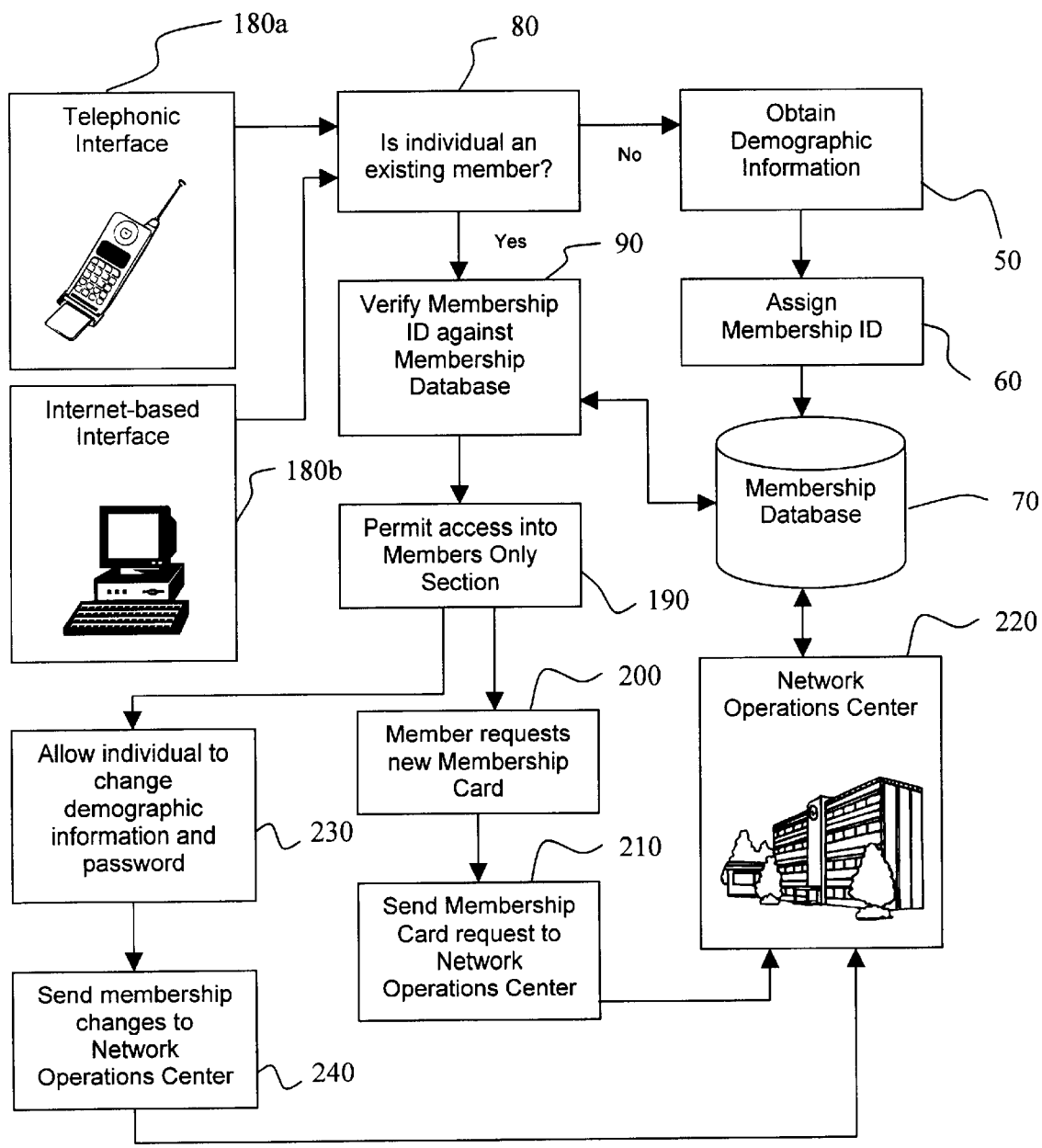
FIG. 2 is a flow chart describing the process of obtaining demographic information from individuals according to a preferred embodiment of the invention.

FIG. 2 illustrates a preferred method of obtaining demographic information on individuals listening to the broadcast. Information may be obtained in a number of ways. In a preferred embodiment, the collection of this information is automated in either an telephonic 180a or network-based interface 180b. In a telephonic interface 180a, individuals access the system by dialing a telephone number. The system determines whether the individual is an existing member 80. If the individual is not an existing member, demographic information is obtained 50. Individuals navigate through options by pressing buttons on their touch-tone telephones thereby producing DTMF entries. If they choose to sign up for a new membership, they are advised of the details of the membership agreement and the information they must provide. If they continue, they will be prompted for various demographic information recorded by audio voice file or through the use of DTMF entries. Once all the information is entered, a membership ID is assigned to the individual 60 and is recorded in a membership database 70. In a preferred embodiment, the membership database 70 is connected to a network operations center 220. The network operations center 220 is a remotely located control facility which may provide various support functions to the invention including but not limited to membership processing, content catalog distribution, demographic analyzations, performance monitoring, news and weather distribution, system backup, and system redundancy.

The system verifies 90 a membership ID against the membership database 70 before permitting access into a members only section of the system 190. Within the members only section, the individual may change his or her demographic information and password 230 if desired. In a preferred embodiment, such charges are sent 250 to the network operations center 220 for recordation. An individual may also request a new membership card 220 which request may also be sent 210 to the network operations center 220 for processing.

As an alternative to the telephonic interface 180a, individuals may process their membership application through an network-based interface 180b. In an illustrative embodiment of the invention, an individual enters via an Internet website and is given general and specific information about the company hosting the system. If they are not currently a member 80, they will be asked for demographic information 50 and assigned a membership ID 60. In the case of an Internet-based interface 180*b*, it is preferable that the membership ID and any associated password be electronically mailed to the individual thereby giving that individual immediate access to the members only section 190.

In several respects, the Internet-based interface 180*b* is the preferred embodiment as individuals may be exposed to a graphically rich environment. The use of electronic mail delivery of the membership ID and the ability to list and update media content online utilizes the best features of the Internet medium. Furthermore, it is sometime difficult to obtain all the demographic information from an individual over the telephone using strictly DTMF signals. Users may be required to speak portions of their information such as their address into the system for manual transcription at a later time. An advantage of the Internet-based system is that users may fill out their complete demographic information using online forms which eliminates the need for manual salt transcription and therefore requires less operating costs.

Figure 3:
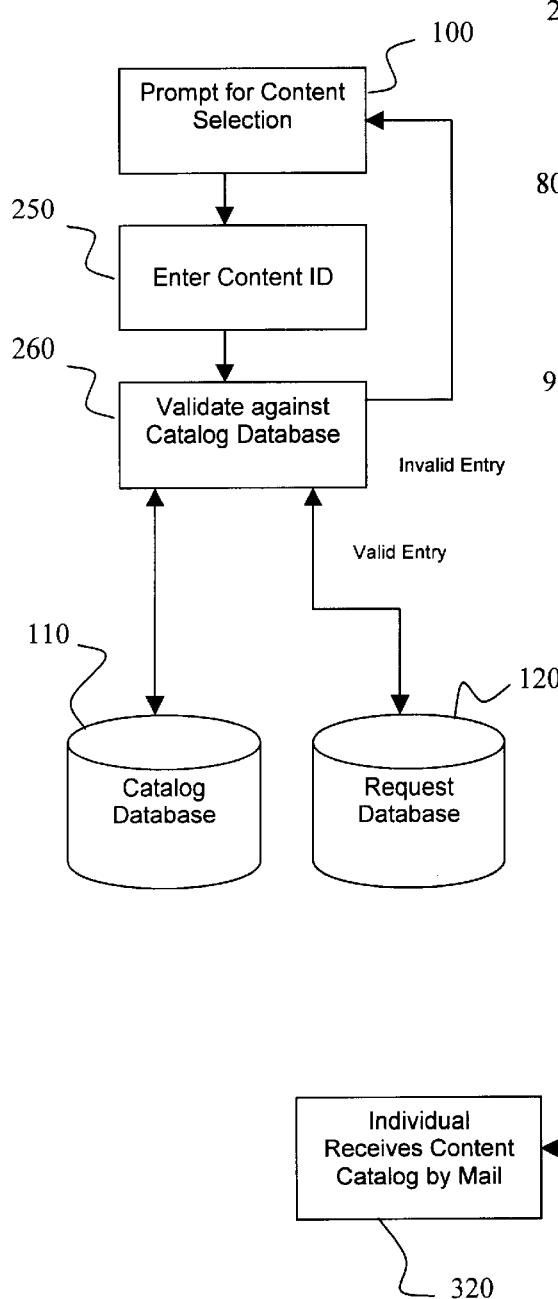
FIG. 3 is a flow chart describing the process for selecting content.

FIG. 3 shows the method of requesting content for broadcast. Individuals whose membership ID have been validated are prompted for a content selection 100. The content may include music, news, educational segments or the like. Each media segment has a content ID, which is an associated variable that identifies itself to the software. The individual may depress the content ID on the telephone thereby producing DTMF signals. Alternatively, the individual may select the content off an Internet web site listing. The content ID is then validated 260 against the catalog database 110. If the selection is present in the catalog database 110, the entry is sent to a request database 120.

Figure 4:
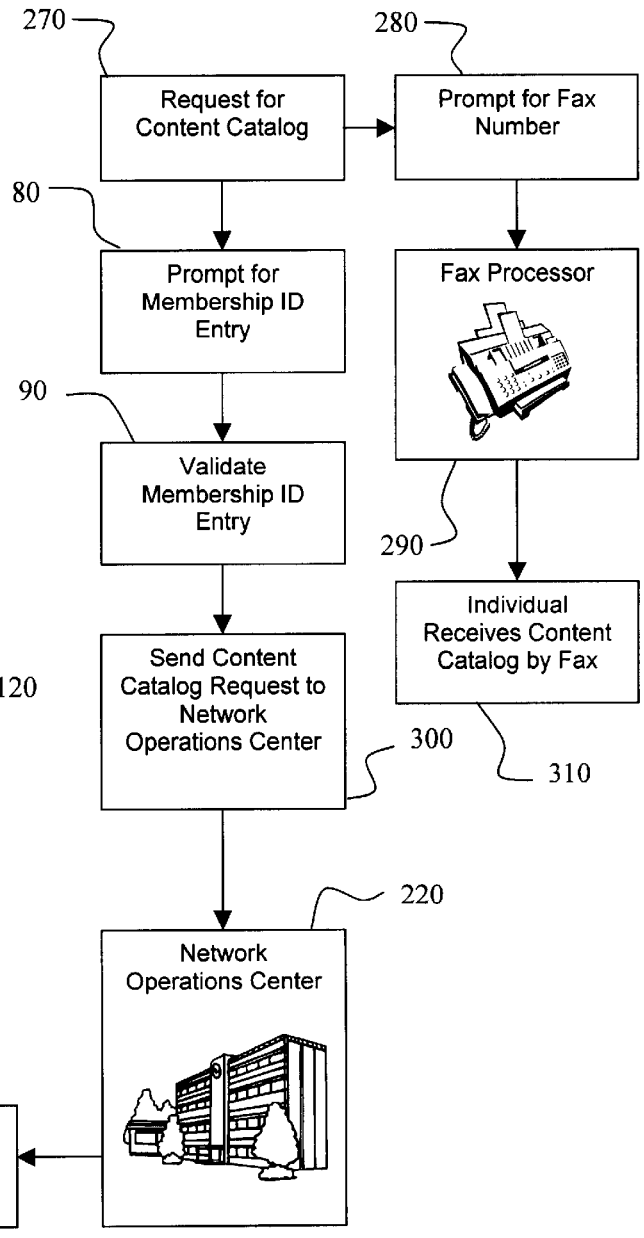
FIG. 4 is a flow chart describing the process of delivering the content catalog according to a preferred embodiment of the invention.

FIG. 4 illustrates a method for delivering the content catalog to the individual. An individual utilizing the Internet-based interface 180*b* may simply click a hyperlink to a listing of available content and request the content online. However, for individuals using alternative interfaces such as the telephone, an alternative delivery system is required. Upon request for a content catalog 270, the user may have the catalog delivered by fax or by mail. If it is desired that the catalog be delivered by fax, the individual is prompted for the destination fax number 280. The system then forwards the request to a fax processor 290 which in turn sends the fax which is received by the individual 310. As an alternative to faxing the content catalog, the catalog may also be mailed. In a preferred embodiment, the individual's address will already be stored within his or her demographic file. Therefore, to request a mailed catalog, the individual is prompted for his or her membership ID 80. The individual's entry is validated 90 and a content catalog request is sent to the network operations center 300. The network operations center 220 receives the request and mails the catalog. The individual then receives the content catalog by mail 320.

Figure 5:
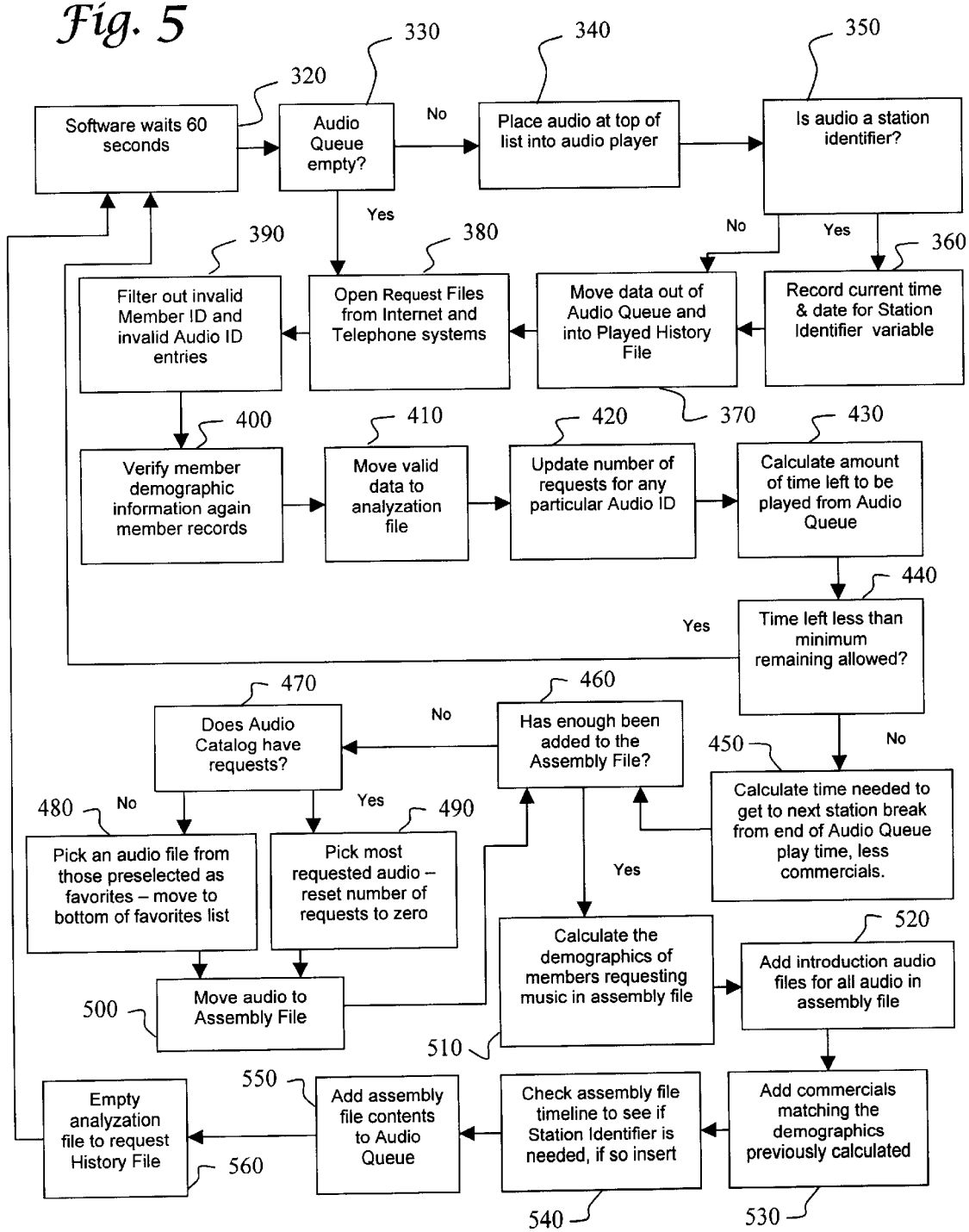
FIG. 5 is a flow chart describing the software programming for carrying out an embodiment of the invention adapted to broadcast audio.

FIG. 5 illustrates an embodiment of the invention adapted to deliver radio broadcasts. In this illustrative embodiment, a software process cycles and waits 60 seconds 320. The software checks to see if the audio queue is empty 330. If the audio queue is empty, the system must have just been started or cleared so the procedure to make an audio set is run to file the queue by opening request files from the Internet and telephonic interfaces 180*b* and 180*a* respectively. If the audio queue is not empty, the audio file at the head of the queue is placed in the audio player application 340. The system checks to for a variable indicated if the audio file being played is a station identifier 350. If it is, a station ID system variable is updated with the current time and date 360 and the system continues. If the audio file is not a station identifier or the station identifier variable has just been set, the system then moves the last played audio file to a history database along with the time and date the filed was played 370. The system then checks if request files for the Internet or telephonic interfaces are present in a specified location 380. If so, they are imported and filed to verify valid member IDs and audio IDs 390. The invalid information is discarded. Member demographic information is added from the membership database and the combined data is moved to an analyzation file 410. Based on the number of requests for a specific audio file, its recent request variables in the database are updated 420. The time left to play in the audio queue is calculated 430 based on predefined playtimes being summed. The system analyzes whether the time left to play is greater than a pre-defined minimum allowed queue time 440. If the time left is less than the minimum allowed, the system cycles back to the 60 second wait 320. Otherwise, the processing continues.

The system calculates the amount of time needed to be filled until the next commercial break, less the commercials to be added at the break 450. This also takes into account the time left to play in the audio queue currently. Audio files, commercial files and other audio data are assembled into an assembly file for playback. The system checks to see if the assembly file has met the amount of time required to fill a time frame 460. If an insufficient amount of time exists, the system check to see if the audio catalog has entries that have been requested by members 470. If the system has request entries, it takes the most requested file 490 and moves it to the assembly file 500. If the system has no member requested audio, the system picks from a list of pre-selected favorites 480 and moves the selection to the assembly file 500. The system then marks that audio file with the current time and date as being played.

Once the assembly file has enough audio files in it, it moves on to calculate the demographics of the members that placed requests for the audio files from information in the analyzation file 510. The system then adds the audio file for a set introduction to the beginning of the assembly file 520. The system then adds commercials based on matching demographics calculated in the previous process 530. The system checks an assembly file timeline to see if a station identifier is needed 540. If the station identifier is needed, it is inserted into the assembly file at the appropriate point.

All assembly file contents are then added to the bottom of the audio queue 550. Completed analyzation file contents are moved to the request history file 560 before the system cycles.

Figure 6:
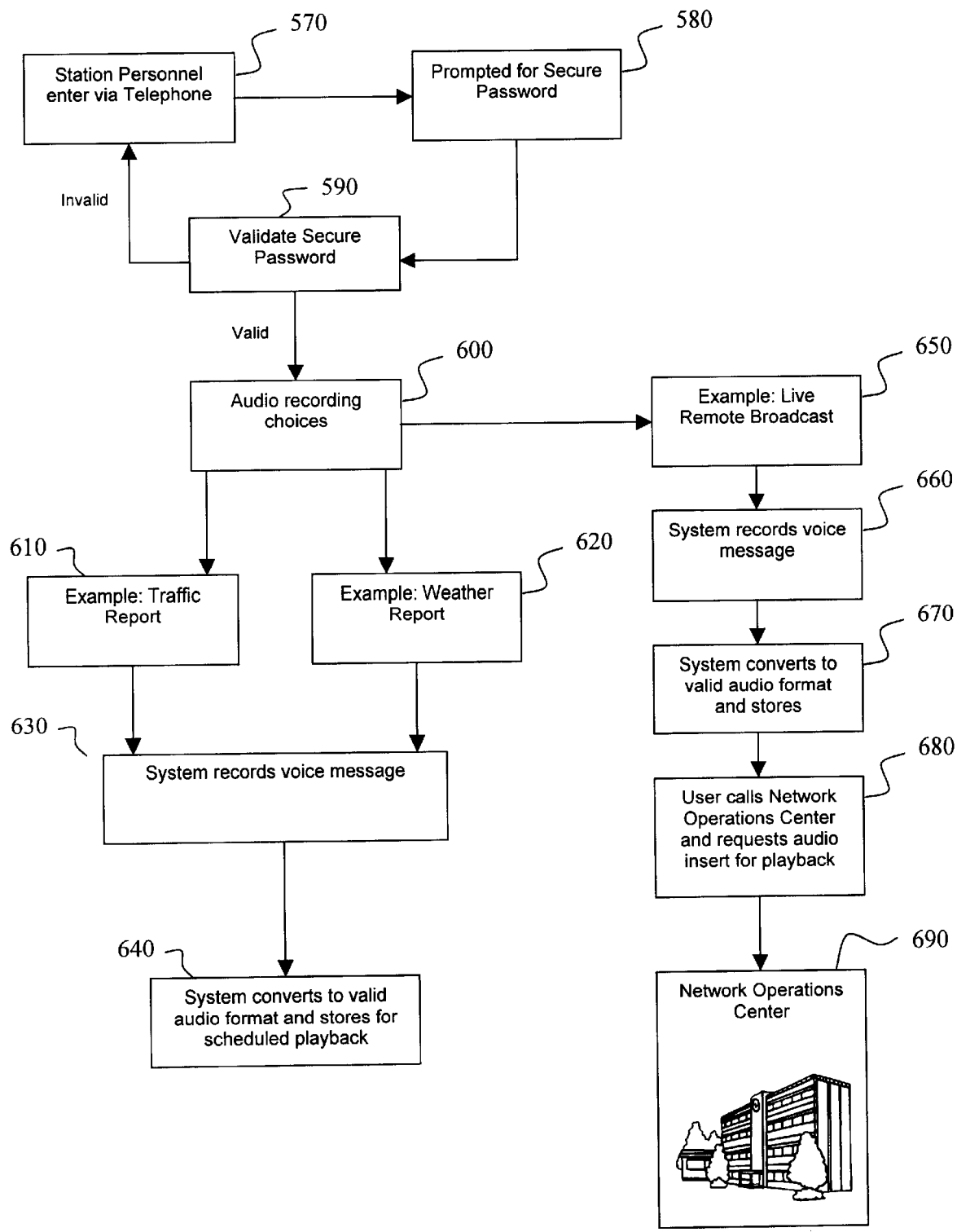
FIG. 6 is a flow chart describing the process of recording and preparing news, weather and live updates for broadcast according to the invention.

In FIG. 6. authorized users dial into a remote broadcast system 570. The user is prompted for a secure password 580 which is validated 590 before the user is permitted to access the system. The user may then have a series of audio recording choices 600. As examples, the user may record a traffic report 610 or a weather report 620 for broadcast by the automated system. The user records the voice message report 630 upon which the system converts to a valid audio format and stores for scheduled playback 640. For live, unscheduled broadcasts, 650, the system records a voice message 660 and coverts it to a valid audio format for storage 670. The user then requests audio insertion 680 from the network operations center 690. The network operations center 690 then inserts the unscheduled message into the audio queue for playback.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of delivering media content comprising the steps of: creating a membership database comprising the steps of:
    (a) obtaining an array of demographic information from an individual;
    (b) assigning said individual a unique membership ID;
    (c) storing said membership ID and said array of demographic information in said membership database;
obtaining a request for media content comprising the steps of:
    (a) identifying said individual from said unique membership ID;
    (b) prompting said individual for selection of a media segment from a catalog database;
    (c) associating said media segment and said individual's array of demographic information in a request database;
broadcasting media content comprising the steps of:
    (a) accessing said request database;
    (b) assembling a play list from the most requested media segments in said catalog database based on a predetermined formula; and
    (c) executing said play list.

2. The method as in claim 1, further comprising the steps of:
    (a) obtaining said array of demographic information from an individual by telephonic means comprising the steps of:
        (1) accepting an incoming telephone call from a telephone caller;
        (2) prompting said caller to relay an array of demographic information;
        (3) associating said array of demographic information with a unique membership ID; and
        (4) transmitting said unique membership ID to said telephone caller.

3. The method as in claim 1, further comprising the steps of:
    (a) posting one or more form-based interfaces on a data network;
    (b) prompting a network user for an array of demographic information;
    (c) associating said array of demographic information with an associated membership ID; and
    (d) transmitting said membership ID to said network user.

4. The method as in claim 1, further comprising the step of interspersing a system identifier at predetermined intervals within said play list.

5. The method as in claim 1, further comprising the step of interspersing one or more public service announcements at predetermined intervals within said play list.

6. The method as in claim 1, further comprising the step of interspersing one or more individual commercial segments at predetermined intervals within said play list.

7. The method as in claim 6, further comprising the steps of:
    (a) associating a demographic value with an individual commercial segment;
    (b) analyzing said play list for one or more common demographic values of said individuals who requested the media segments in said play list; and
    (c) broadcasting said individual commercial segments whose demographic values most closely match said common demographic values of said individuals who requested the media segments in said play list.

8. The method as in claim 7, further comprising the step of recording the number of instances said individual commercial segment is played.

9. The method as in claim 1, further comprising the step of interspersing one or more prerecorded news updates at predetermined intervals.

10. The method as in claim 9, further comprising the steps of accepting a media upload from an authorized user and inserting said media upload in said play list.

11. The method as in claim 9, further comprising the steps of receiving an analog media segment comprising said prerecorded news update from an authorized user, converting said analog media segment to a digital media segment, and inserting said digital media segment into said play list.

12. The method as in claim 11, wherein said analog media segment comprising said prerecorded news update is received telephonically.

13. The method as in claim 9, further comprising the steps of uploading said prerecorded news updates through a network interface from a verified source for insertion into said play list.

14. The method as in claim 9, further comprising the step of time-stamping said news updates wherein out-of-date media segments are not inserted into said play list.

15. The method as in claim 1, further comprising the step of recording said demographic information associated with said play list into a history file.

16. The method as in claim 1, further comprising the step of maintaining remote supervision and control over said method of delivering media content via a network connection to a remotely located network operations center.

17. The method as in claim 1, further comprising the step of offloading said membership-associated functions to a remotely located network operations center.

18. The method as in claim 1, wherein said media content is audio and further comprising the step of broadcasting said play list by radio frequency transmission.

* * * * *